United States Patent [19]

Passebecq

[11] Patent Number: 5,482,320
[45] Date of Patent: Jan. 9, 1996

[54] STEERING COLUMN ASSEMBLY AXIALLY RETRACTABLE IN THE EVENT OF IMPACT, IN PARTICULAR FOR AN AUTOMOBILE VEHICLE

[75] Inventor: Ghislain Passebecq, Audincourt, France

[73] Assignee: ECIA - Equipements et Composants pour l'Industrie, Audincourt, France

[21] Appl. No.: 275,549

[22] Filed: Jul. 15, 1994

[30] Foreign Application Priority Data

Jul. 16, 1993 [FR] France .................................. 93 08779

[51] Int. Cl.$^6$ .................................................. B62D 1/11
[52] U.S. Cl. ............................................. 280/777; 74/492
[58] Field of Search ................................... 280/775, 777; 74/492

[56] References Cited

U.S. PATENT DOCUMENTS

| | | | |
|---|---|---|---|
| 4,337,967 | 7/1982 | Yoshida et al. | 280/777 |
| 4,968,058 | 11/1990 | Jones | 280/777 |
| 5,295,712 | 3/1994 | Omura | 280/777 |

FOREIGN PATENT DOCUMENTS

| | | | |
|---|---|---|---|
| 0317791A2 | 10/1988 | European Pat. Off. . | |
| 0470888A1 | 2/1992 | European Pat. Off. . | |
| WO8805741 | 8/1988 | WIPO . | |

OTHER PUBLICATIONS

French Search Report FR 9308779.

*Primary Examiner*—Kenneth R. Rice
*Attorney, Agent, or Firm*—Sughrue, Mion, Zinn, Macpeak & Seas

[57] ABSTRACT

The assembly comprises a support structure (1) fixed to the rest of the vehicle and on which are fixed ends of a column body (2) in which a shaft (3) is disposed, and means for axially retracting the body and consequently the shaft in the event of impact. The retracting means (8) comprise a force generator actuatable upon impact for displacing the body (2) relative to the support structure. The force generator comprises two parts movable relative to each other, one part (9) being connected to the structure (1) and the other part (10) to the body in the vicinity of an end of the latter. This end of the body is connected to the structure (1) by means which are releasable upon actuation of the generator and comprise guide means adapted to cooperate with complementary means of the structure (1), and the means for fixing the other end of the body to the structure (1) comprise a bearing for guiding the body.

6 Claims, 4 Drawing Sheets

STEERING COLUMN ASSEMBLY AXIALLY RETRACTABLE IN THE EVENT OF IMPACT, IN PARTICULAR FOR AN AUTOMOBILE VEHICLE

BACKGROUND OF THE INVENTION

The present invention relates to a steering column assembly which is axially retractable in the event of impact, in particular for an automobile vehicle.

The safety of the passengers and in particular of the driver of an automobile vehicle is a constant concern of equipment suppliers and vehicle constructors.

In order to reduce the risks of injury of these passengers in the event of impact there has been developed in the prior art a number of systems for protecting them.

Thus for example more or less perfected safety belt systems have been developed to maintain the passengers of a vehicle on their seat in the event of impact.

Modules comprising an inflatable bag have also been proposed which are for example integrated in the central bearing of the vehicle steering wheel and in the dashboard on the side of the front passenger.

It will in particular be realized that the steering wheel may become extremely dangerous for the driver of a vehicle in the event of impact.

Indeed, the head of the driver frequently strikes against the steering wheel in the event of an impact and it also occurs, in the event of a large impact from the front, that the steering column assembly carrying this steering wheel is displaced inwardly of the compartment of the vehicle toward the driver, which still further increases the risk of injury to the latter.

In order to overcome these problems, there have therefore been developed in the prior art steering column assemblies which are axially retractable in the event of impact and comprise a support structure fixed to the rest of the vehicle and on which are fixed the ends of a column body in which a steering shaft is disposed.

These column assemblies further comprise means for axially retracting the column body, and consequently the steering shaft, in the event of impact so as to cause the retraction of this body into the dashboard of the vehicle and consequently move the steering wheel away from the driver of the vehicle in the event of impact.

In the prior art, the retracting means for example comprise one or more traction cables associated with direction changing means, one of the ends of the or each cable being connected to the engine of the vehicle and the other to the column assembly for the purpose of retracting the latter in accordance with the rearward displacement of the engine upon impact.

However, these arrangements have a number of drawbacks, in particular regarding their extremely complex and space-consuming structure, their cost and their reliability.

SUMMARY OF THE INVENTION

An object of the invention is therefore to overcome these problems by providing a steering column assembly which is axially retractable in the event of impact, simple and reliable.

The invention therefore provides a steering column assembly which is axially retractable in the event of impact, in particular for an automobile vehicle, of the type comprising a support structure fixed to the rest of the vehicle and on which are fixed the ends of a column body in which a steering shaft is disposed, and means for axially retracting the column body, and therefore the steering shaft, in the event of impact, characterized in that the retracting means comprise a force generator actuatable upon impact, for displacing the body relative to the support structure, said generator comprising two parts movable relative to each other, one part being connected to the support structure and the other part to the body, in the vicinity of an end of the body, said end of the body being connected to the support structure by fixing means releasable upon actuation of the force generator, and comprising guide means adapted to cooperate with complementary guide means of the support structure, and the fixing means of the other end of the body on the support structure comprise a bearing for guiding said body.

A better understanding of the invention will be had from the following description which is given solely by way of example with reference to the accompanying drawings, in which:

DESCRIPTION OF A PREFERRED EMBODIMENT

Figure 1:
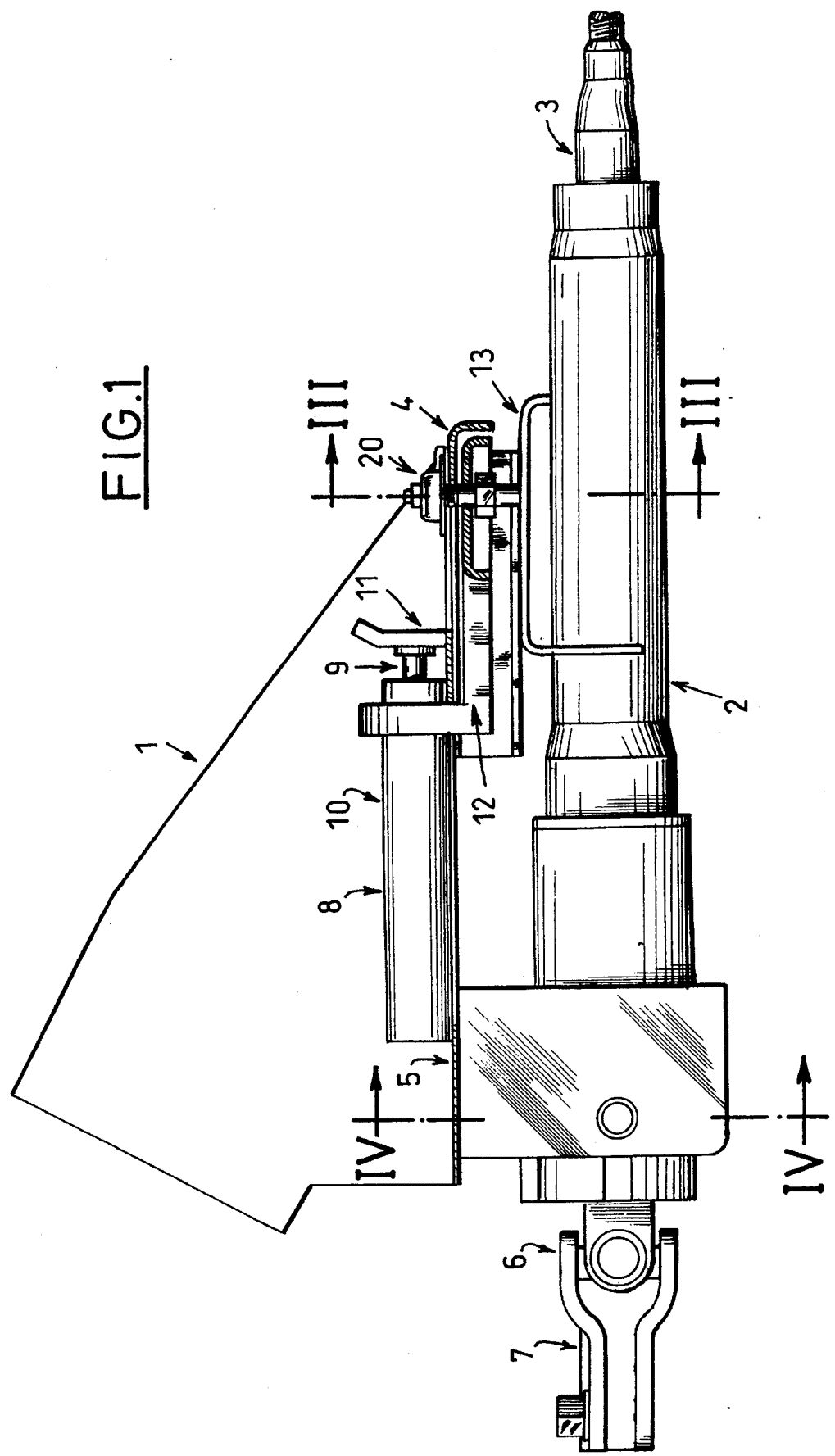
FIG. 1 is a diagrammatic side elevational view of a steering column assembly according to the invention in its normal position of operation.

As can be seen in the drawings, a steering column assembly which is axially retractable in the event of impact, in particular for an automobile vehicle, according to the invention, comprises a support structure designated by the general reference numeral 1 fixed to the rest of the vehicle (not shown) and on which are fixed the ends of a steering column body designated by the general reference numeral 2.

A steering shaft 3 is disposed within this column body 2.

Conventionally, this shaft is rotatable but prevented from moving in translation in the body 2.

One end of the steering column body is fixed at 4 to the support structure while the other end of the body is fixed at 5 to this structure.

One of the ends of the steering shaft is adapted to receive a steering wheel, while the other end of the shaft is adapted to be connected at 6, to the rest 7 of the vehicle steering mechanism, for example by means of a universal joint.

The steering column assembly according to the invention further comprises means for axially retracting the body, and therefore the steering shaft and the steering wheel, in the event of impact, relative to the support structure.

These retracting means are designated by the general reference numeral 8 in FIG. 1 and comprise a force generator actuated upon impact for sliding the body 2 relative to the support structure 1.

This force generator comprises two parts, for example 9 and 10 which are movable relative to each other, one part, for example the part 9, being connected to the support structure 1 by means of a support bracket 11 for this end and the other, for example the part 10, being connected to the body 2 for example by means of a connecting member 12.

One end of this connecting member 12 is fixed to the part 10 of the generator and the other end is connected to the body in the vicinity of an end of the latter and more particularly the end which is the closest to the steering wheel carried by the steering shaft in the illustrated embodiment.

The force generator may be of any suitable known type, for example a generator employing pyrotechnic means, a generator employing gas, or a generator employing a loaded or stressed resilient member, the actuation of which generator is achieved for example by the rest of the circuits of the vehicle upon detection of an impact.

Figure 3:
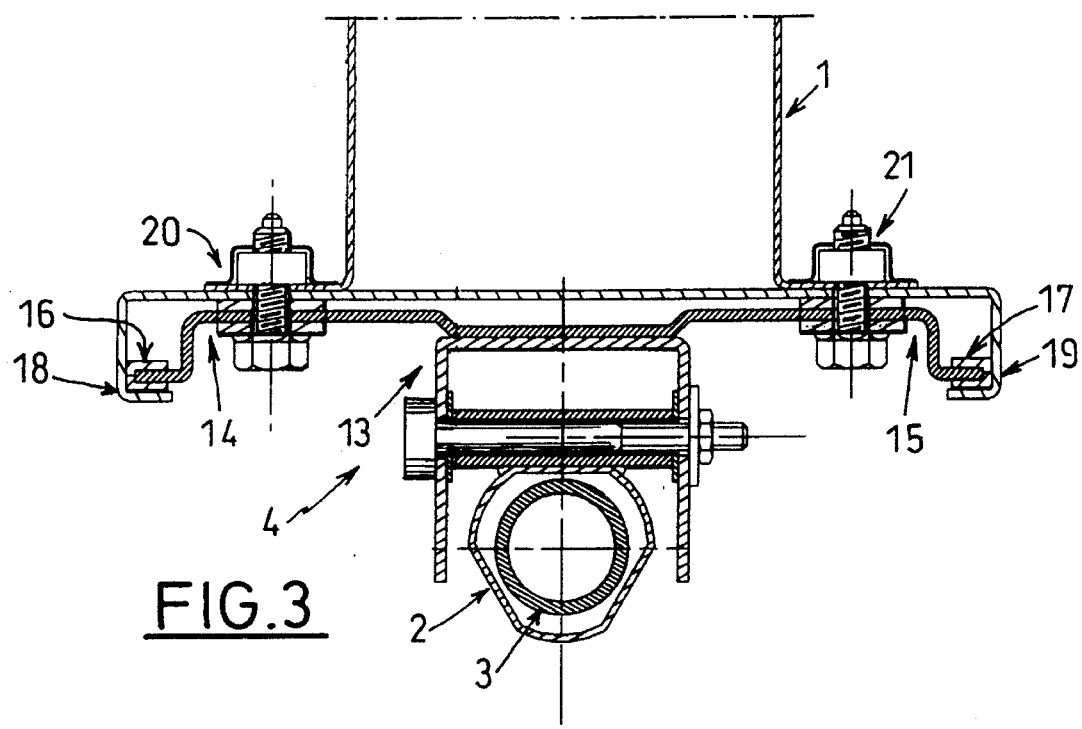
FIG. 3 is a sectional view taken on line III—III of FIG. 1.

As can be seen more particularly in FIG. 3, the end of the body 2 to which the force generator, and more particularly the part 10 of the latter, is connected by the connecting member 12, comprises for example a mounting member 13 provided with lateral flanges the ends of which include for example guide shoes 16 and 17 adapted to cooperate with complementary slideways 18 and 19 of the support structure 1, when the body is displaced relative to the support structure so as to guide this displacement.

However, in the normal position of operation, this end of the body is fixed to the support structure 1 by releasable fixing means constituted for example by frictional immobilizing means or by shearable bolts 20 and 21 or other means.

As will be described in more detail hereinafter, these bolts 20 and 21 are sheared upon the actuation of the force generator.

Figure 4:
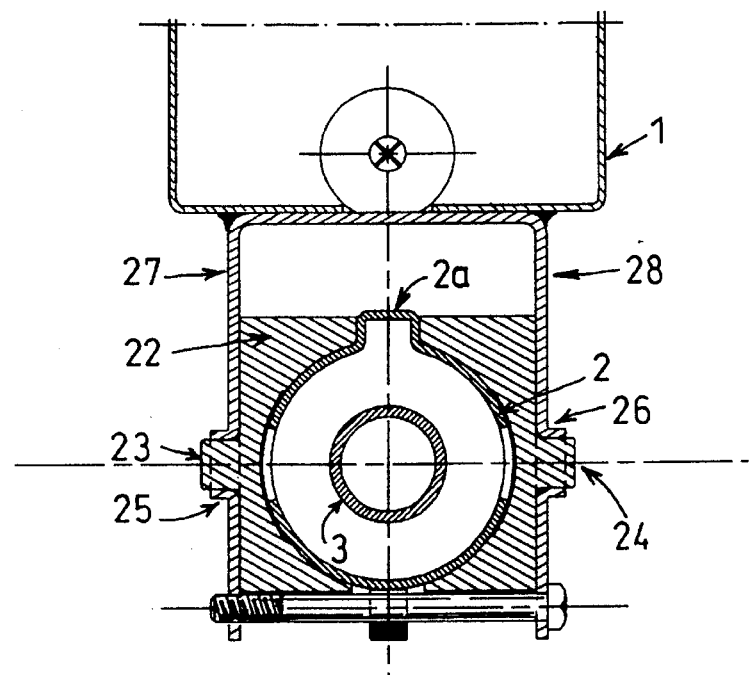
FIG. 4 is a sectional view taken on line IV—IV of FIG. 1.

As shown in FIG. 4, the means for fixing the other end of the body to the support structure, located at 5, comprise a bearing 22 for slidably guiding the body upon actuation of the force generator.

It will be observed with reference to FIG. 4 that the body 2 may comprise for example a projecting portion 2a adapted to cooperate with complementary abutment surfaces of this bearing for performing an anti-theft function for the vehicle.

This bearing may be for example composed of a plastics material.

The bearing advantageously includes two lateral projecting portions 23 and 24 adapted to engage in connecting bushes 25 and 26 provided in flanges 27 and 28 of the support structure 1.

The assembly just described operates in the following manner.

Note first of all that the embodiment just described relates to a steering column assembly which is fixed in position, i.e. which cannot be adjusted in position by the user.

However, it will be clear that this possibility may be envisaged by simply modifying the structure of the mounting member 13 described with reference to FIG. 3 and providing in this member slots for guiding the body and means for immobilizing the body adapted to be manipulated by the user in the known manner.

In the normal state of operation of the steering column assembly, the force generator 8 is not actuated and the corresponding end of the body is fixed to the support structure by the bolts 20 and 21.

The other end of the body is held in position by the bearing 22.

Figure 5:
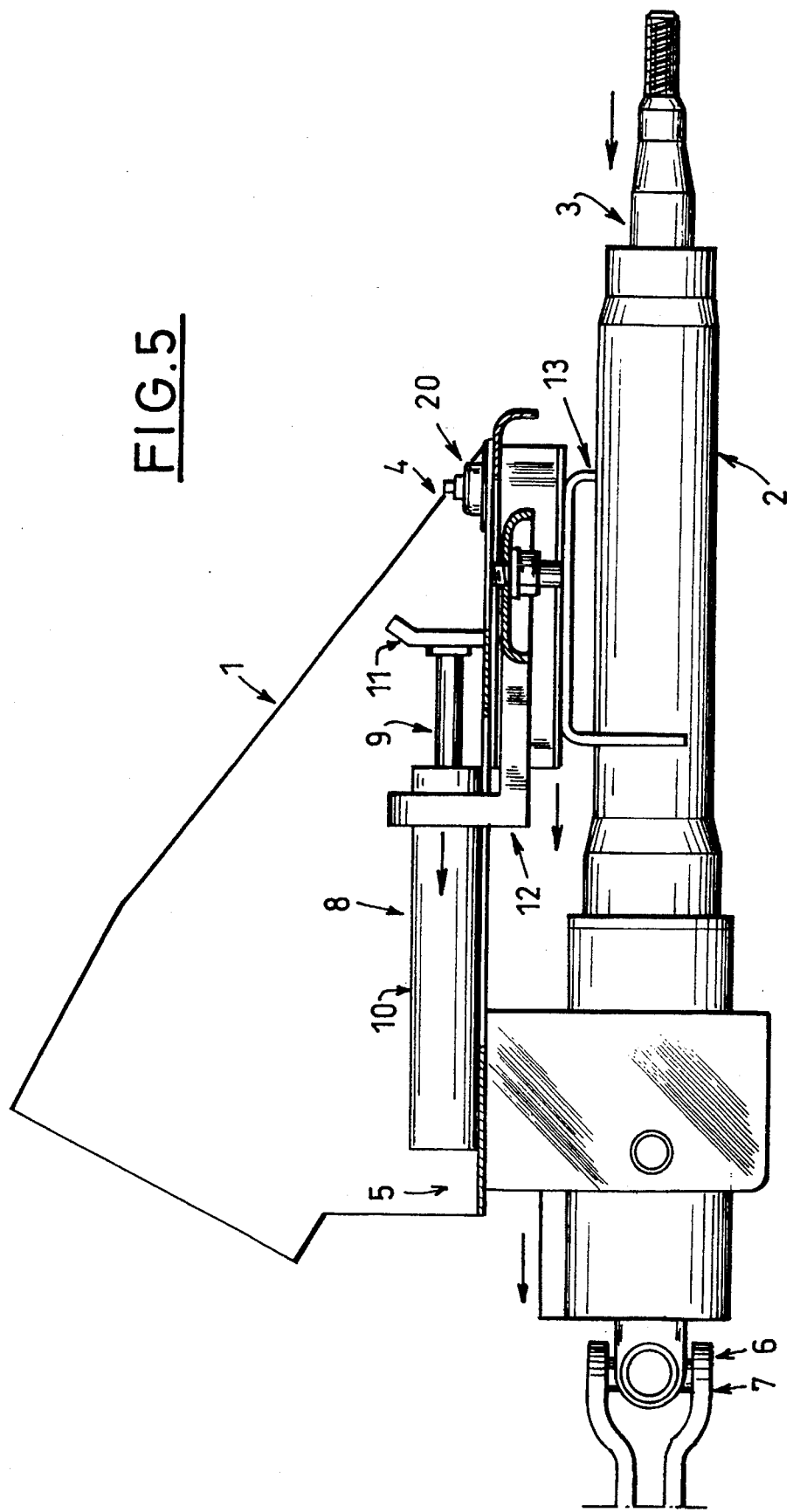
FIG. 5 is a diagrammatic side elevational view of a steering column assembly according to the invention in its retracted position.

In the event of impact, and as can be seen in FIG. 5, the force generator 8 is actuated, for example by the rest of the circuits of the vehicle.

As the part 9 of the force generator bears against the bracket 11 of the support structure, the part 10 of the force generator tends to move rearwardly relative to the support structure and drive the steering column body 2 along therewith through the connecting member 12.

This driving force causes the fracture of the shearable bolts 20 and 21 and consequently the release of this end of the body relative to the support structure.

The fracture of these breakable bolts 20 and 21 then allows the sliding of the steering column body, and consequently of the steering shaft, relative to the support structure, this sliding being guided, on one hand, by the complementary guide means of this end of the body formed by the guide shoes 16, 17 of the lateral flanges 14 and 15 of the mounting member and the slideways 18 and 19 of the support structure and, on the other hand, by the guide bearing 22 for the other end of the body.

The body and the shaft, and consequently the steering wheel carried by the latter, then move back relative to the support structure to a retracted safety position shown in FIG. 5.

The operation just described assumes that the movement of retraction of this body is not hindered by some obstacle in the region of the universal joint connecting the steering shaft to the rest of the steering mechanism of the vehicle.

Figure 2:
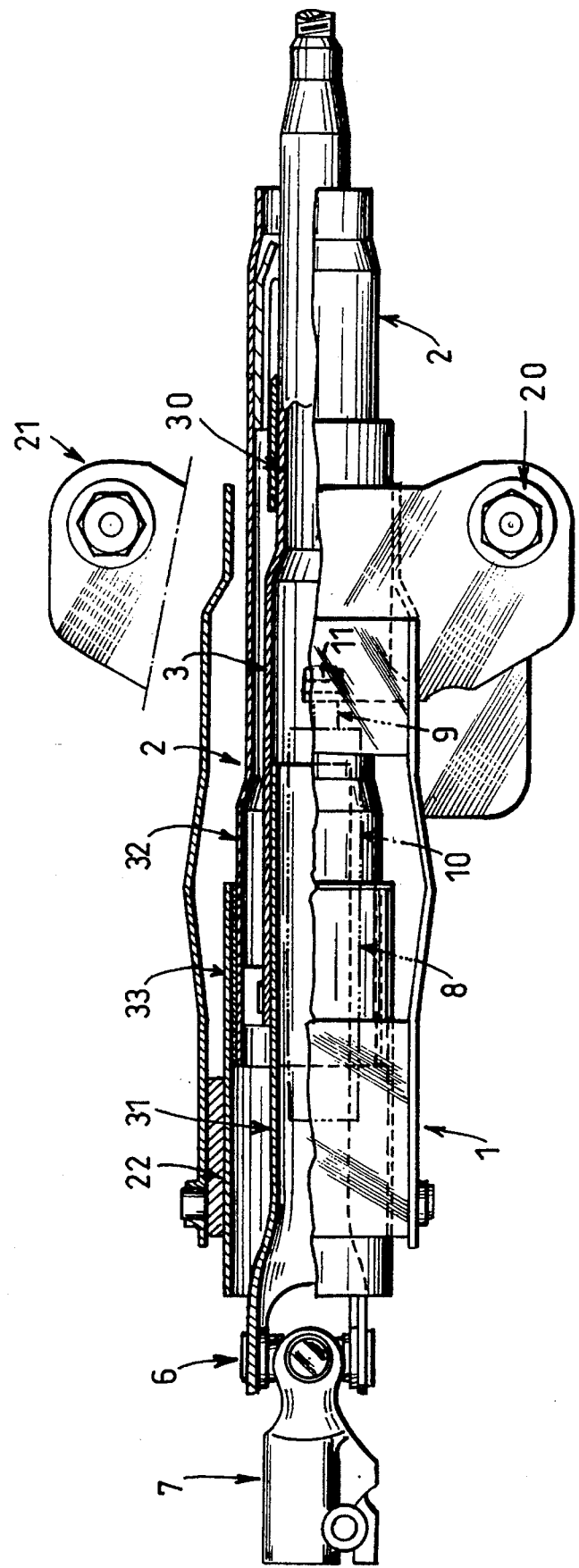
FIG. 2 is a top plan view, partly in section, of a column body which is part of the structure of the steering column assembly shown in FIG. 1.

For the purpose of overcoming the problems created by the presence of an obstacle in this region or by the rising of any component part of the vehicle which would tend to exert a thrust on this end of the shaft or of the column body and cause it to travel back to its normal position, the steering shaft and the steering column body may advantageously each be constituted by two relatively telescopic parts, as shown in FIG. 2.

As can be seen in FIG. 2, the steering shaft 3 comprises in fact two telescopic parts 30 and 31 and the steering column body 2 also comprises two telescopic parts 32 and 33, the corresponding parts of the shaft and body being axially held in position relative to each other in the conventional manner.

It will therefore be understood that, if an obstacle hinders the retraction of the column body, by blocking for example the end of the steering shaft connected to the universal joint, the retraction of the assembly can nonetheless occur inasmuch as the shaft and body parts are free to move one on or in the other.

For example, in the case where the shaft part 31 and the body part 33 are blocked against movement and cannot move back, the shaft part 30 and the body part 32 are movable around and in these shaft and body parts and allow the retraction of the assembly.

This telescopic displacement of the shaft and body parts may also be envisaged in the case where, upon the displacement of the body toward its retracted position after actuation of the force generator, some component part of the vehicle exerts a thrust on the universal joint or on the corresponding end of the column body, and tends to cause the assembly to move back toward the normal position.

In this case, the shaft part 30 and the body part 32 are held in position, for example by the force generator which is then provided with conventional anti-return means, and the shaft part 31 and body part 33 are then displaced in and around the corresponding shaft part 30 and body part 32 to avoid this return toward the normal position.

It will be understood that this holding in position of the shaft part 30 and body part 32 may also be achieved by other means, such as by slideway steps of the support structure adapted to block the shoes of the flanges of the body mounting member.

It will be clear that these anti-return means may be provided in the previously-described two embodiments of the shaft and body for preventing any rising of the body.

Other embodiments of the body guide means and of the support structure may be envisaged.

Indeed, in the foregoing description guide means were described which comprise guide shoes for the body adapted to cooperate with slideways of the support structure, but it may also be envisaged to employ guide means which are for example in the form of a connecting mounting member pivotally connected to the body and to the support structure.

In this case, upon the actuation of the force generator, the sliding of the body relative to the support structure is combined with an angular displacement of the body.

What is claimed is:

1. A steering column assembly, axially retractable in the event of impact, for an automobile vehicle, said assembly comprising in combination: a support structure fixed to the vehicle, a steering column body having a first end portion and an opposed second end portion, a steering shaft disposed within said column body, and means for axially retracting said column body, and consequently said steering shaft, in the event of impact;

said retracting means comprising a force generator, actuatable upon impact, operatively connected to said column body for displacing said column body relative to said support structure;

said generator comprising a first part and a second part movable relative to each other, said first part being connected to said support structure, and said second part being connected to said column body in the vicinity of said first end portion of said column body;

said assembly further comprising first fixing means for connecting said first end portion of said column body to said support structure and releasable upon actuation of said force generator, first guide means associated with said first end portion of said column body, complementary second guide means associated with said support structure and cooperative with said first guide means for guiding said column body during the displacement thereof, and second fixing means for connecting said second end portion of said column body to said support structure and comprising a bearing for guiding said column body during the displacement thereof;

wherein said column body and said steering shaft each comprise two telescopic parts engaged one in the other.

2. Assembly according to claim 1, comprising means for blocking said column body in the retracted position of said column body.

3. Assembly according to claim 1, wherein said releasable first fixing means comprise shearable bolts.

4. Assembly according to claim 1, wherein said releasable first fixing means comprise frictional immobilizing means.

5. Assembly according to claim 1, wherein said column body comprises a mounting member including lateral flanges provided with said first fixing means and said first guide means.

6. Assembly according to claim 5, wherein said first guide means comprise guide shoes on said lateral flanges, and said support structure comprises slideways constituting said second guide means cooperative with said guide shoes.

* * * * *